(12) United States Patent
Shan et al.

(10) Patent No.: US 11,849,164 B2
(45) Date of Patent: Dec. 19, 2023

(54) METHOD FOR DETECTING LIVE STREAMING JITTER, DEVICE, AND MEDIUM

(71) Applicant: BEIJING BAIDU NETCOM SCIENCE TECHNOLOGY CO., LTD., Beijing (CN)

(72) Inventors: Tengfei Shan, Beijing (CN); Xiaoen Zhu, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/820,207

(22) Filed: Aug. 16, 2022

(65) Prior Publication Data

US 2022/0400299 A1 Dec. 15, 2022

(30) Foreign Application Priority Data

Aug. 23, 2021 (CN) .......................... 202110970407.7

(51) Int. Cl.
*H04N 21/24* (2011.01)
*H04N 21/2187* (2011.01)

(52) U.S. Cl.
CPC ..... *H04N 21/2402* (2013.01); *H04N 21/2187* (2013.01)

(58) Field of Classification Search
CPC ........................ H04N 21/2402; H04N 21/2187
See application file for complete search history.

(56) References Cited

U.S. PATENT DOCUMENTS

2017/0142177 A1* 5/2017 Hu ...................... H04L 67/1023

FOREIGN PATENT DOCUMENTS

| CN | 105578211 A | 5/2016 |
|---|---|---|
| CN | 107277160 A | 10/2017 |
| CN | 109921941 A | 6/2019 |
| CN | 111031403 A | 4/2020 |
| CN | 111601102 A | 8/2020 |
| CN | 112243138 A | 1/2021 |
| CN | 113132758 A | 7/2021 |
| WO | 2021042173 A1 | 3/2021 |

OTHER PUBLICATIONS

Extended EP Search Report from related EP application No. EP 22190643, dated Jan. 19, 2023, 11 pages.
Najaflou Nima et al: "The Nearest Origin-Shield (NOS): A Jitter-Free Overlay Routing Framework for Content Delivery Networks", 2019 International Symposium on Networks, Computers and Communications (ISNCC), IEEE, Jun. 18, 2019 (Jun. 18, 2019), pp. 1-6.
Search Report for CN Application No. 202110970407.7, dated Mar. 22, 2022, 2 pages.

* cited by examiner

*Primary Examiner* — Nnenna N Ekpo (74) *Attorney, Agent, or Firm* — Kilpatrick Townsend & Stockton LLP (57) ABSTRACT

Provided is a method for detecting live streaming jitter, a device, and a medium. An implementation is: calculating, for a live stream transmitted by an edge content delivery network (CDN) node in a CDN, quality information of the live stream based on a transmission frame rate and a viewer count of the live stream; calculating quality information of the edge CDN node based on the quality information of the live stream; and determining, based on the quality information of the edge CDN node, whether jitter occurs at the edge CDN node.

18 Claims, 6 Drawing Sheets

METHOD FOR DETECTING LIVE STREAMING JITTER, DEVICE, AND MEDIUM

CROSS REFERENCE TO RELATED APPLICATION

This application claims priority to Chinese Patent Application No. 2021109704077, filed on Aug. 23, 2021, the contents of which are hereby incorporated by reference in their entirety for all purposes.

TECHNICAL FIELD

The present disclosure relates to the technical field of computer networks, in particular to the field of the cloud services, and specifically to a method for detecting live streaming jitter, an electronic device, and a computer-readable storage medium.

BACKGROUND

A content delivery network (CDN) is an intelligent virtual network built based on an existing network, in which by virtue of the edge servers deployed everywhere, through functional modules such as a load balancing module, a content delivery module, and a scheduler module of a central platform, users can access the content they need as close as possible, network congestion is reduced, and a user access response speed and hit rate are improved.

In order to meet a demand of a large number of users to watch live streams, there is often a need to use a CDN to implement content delivery of live streams. The current CDN architecture for live streaming is a multi-level architecture including a plurality of CDN nodes. When a user joins in a live streaming room to watch a live streaming video, a client used by the user is connected to an edge CDN node (for example, accessing a streaming media server of the edge CDN node).

During live streaming, viewing quality of the user may be affected by jitter (for example, frame freezing occurs in live streaming pictures), so it is desirable to accurately detect whether jitter occurs in the CDN to reduce the negative effects of the jitter.

The method described in this section is not necessarily a method that has been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, there is provided a method for detecting live streaming jitter, the method including: calculating, for a live stream transmitted by an edge content delivery network (CDN) node in a CDN, quality information of the live stream based on a transmission frame rate and a viewer count of the live stream; calculating quality information of the edge CDN node based on the quality information of the live stream; and determining, based on the quality information of the edge CDN node, whether jitter occurs at the edge CDN node.

According to an aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform the method for detecting live streaming jitter described in the present disclosure.

According to an aspect of the present disclosure, there is provided a non-transitory computer-readable storage medium storing computer instructions, where the computer instructions are used to cause a computer to perform the method for detecting live streaming jitter described in the present disclosure.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The drawings show example embodiments and form a part of the specification, and are used to explain example implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION OF EMBODIMENTS

Example embodiments of the present disclosure are described below in conjunction with the accompanying drawings, wherein various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, description of well-known functions and structures are omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements; unless otherwise expressly indicated in the context. Moreover, the term "and/or" used in the present disclosure encompasses any of and all possible combinations of listed items.

Embodiments of the present disclosure will be described below in detail in conjunction with the drawings.

Figure 1:
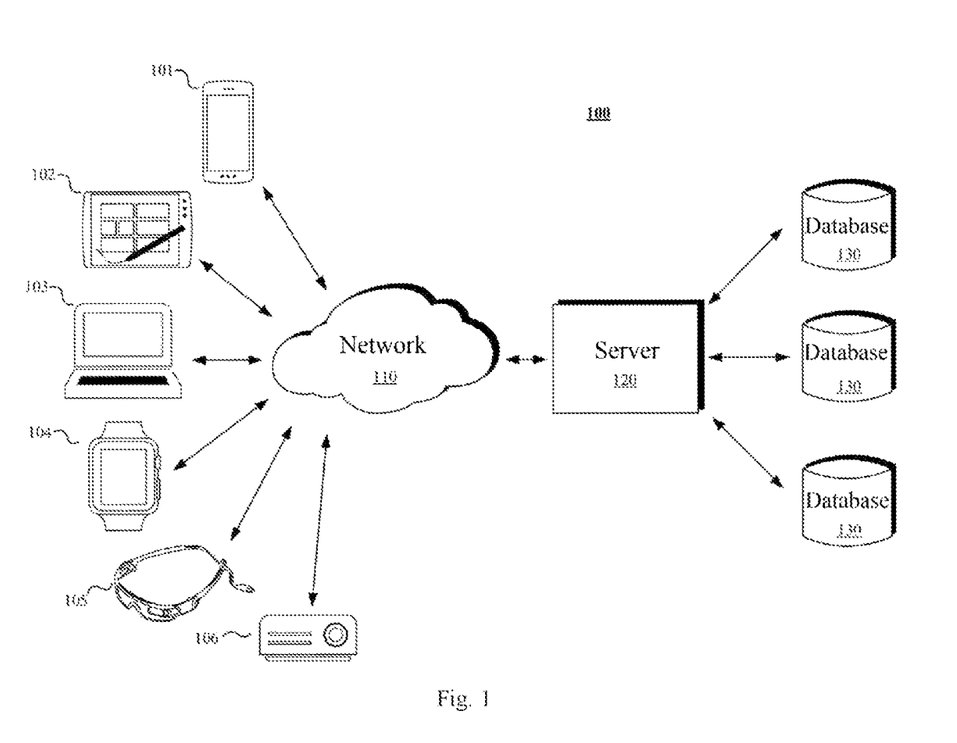
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more application programs.

In an embodiment of the present disclosure, the server 120 may run one or more services or software applications that enable the method for detecting live streaming jitter described in the present disclosure to be performed.

In some embodiments, the server 120 may further provide other services or software applications that may include a non-virtual environment and a virtual environment. In some embodiments, these services may be provided as web-based services or cloud services, for example, they may be provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client device 101, 102, 103, 104, 105, and/or 106 to watch content of a live stream. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a middle-end server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from the user of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The database 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
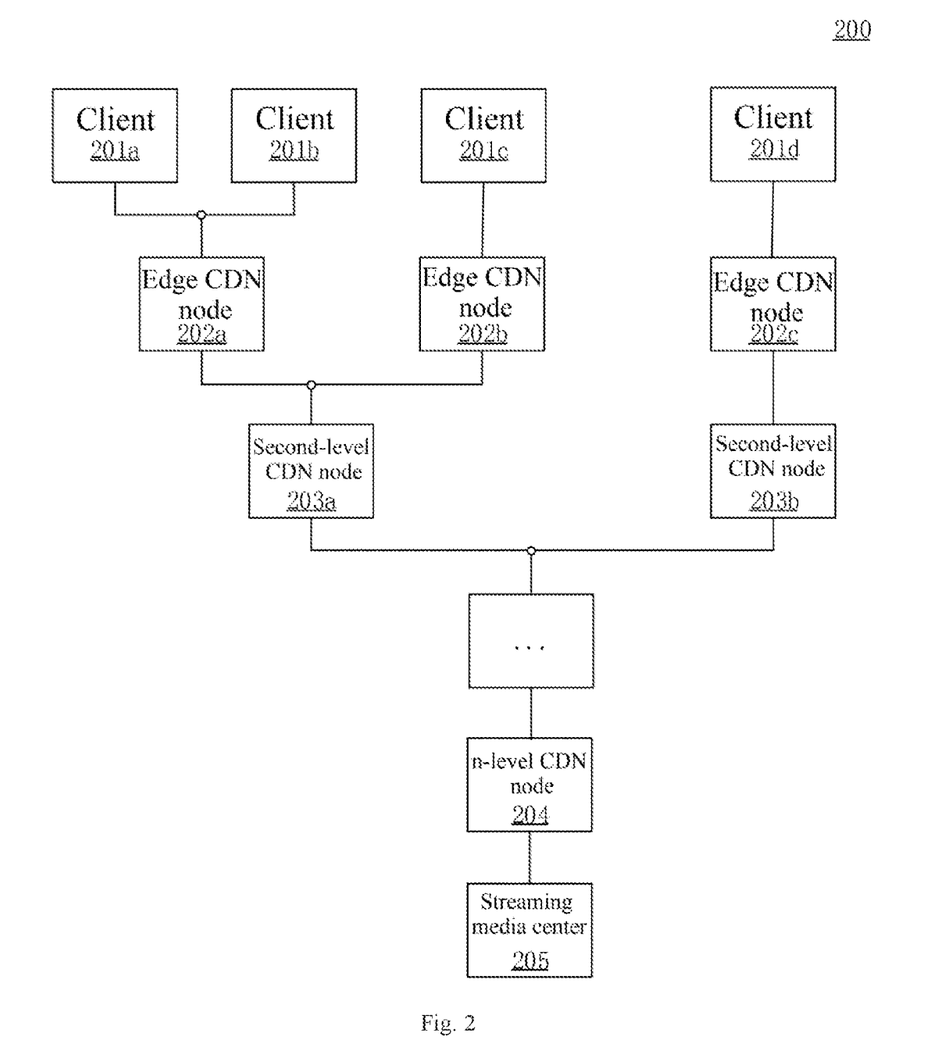
FIG. 2 is a structural diagram of a CDN architecture according to an embodiment of the present disclosure.

FIG. 2 is a structural diagram of a CDN architecture 200 according to an embodiment of the present disclosure.

As shown in FIG. 2, the CDN architecture 200 may include clients 201a to 201d, a plurality of CDN nodes 202a to 202c, 203a to 203b, and 204, and a streaming media center 205. The plurality of CDN nodes 202a to 202c, 203a to 203b, and 204 are hierarchically divided into edge CDN nodes 202a to 202c (also referred to as "first-level CDN nodes"), second-level CDN nodes 203a to 203b, and an n-level CDN node 204 (n is an integer greater than 2).

The clients 201a to 201d are connected to the corresponding edge CDN nodes, wherein the clients 201a to 201b are connected to the edge CDN node 202a, the client 201c is connected to the edge CDN node 202b, and the client 201d is connected to the edge CDN node 202c.

Among the plurality of CDN nodes 202a to 202c, 203a to 203b, and 204, except for the n-level CDN node 204 connected to the streaming media center, each CDN node is connected to its upper-level CDN node, for example, the edge CDN nodes 202a to 202b are separately connected to the corresponding second-level CDN node 203a, and the second-level CDN node 203a is further connected to its upper-level CDN node, . . . , up to the n-level CDN node 204.

The clients 201a to 201d, the CDN nodes 202a to 202c, 203a to 203b, and 204, and the streaming media center 205 are connected through wired communication links or wireless communication links. For example, when a user watches a live streaming video on the client 201a, data of the live stream is transmitted from the streaming media center 205 to the n-level CDN node 204, . . . , to the second-level CDN node 203a, to the edge CDN node 202a, and finally to the client 201a. When the user starts to watch the live streaming video, the edge CDN node 202a sends the data of the live stream to the client 201a if the edge CDN node 202a is already transmitting a live stream corresponding to the live streaming video, and the edge CDN node 202a requests the live stream corresponding to the live streaming video from its upper-level CDN node 203a if the edge CDN node 202a has not yet started to transmit the live stream corresponding to the live streaming video.

When a plurality of users watch the same live streaming video on a plurality clients connected to the same edge CDN node (for example, the client 201a and the client 201b that are connected to the edge CDN node 202a in FIG. 2), the edge CDN node sends data of the same live stream to these clients.

It should be understood that the numbers of clients, CDN nodes, and streaming media centers in FIG. 2 are merely illustrative. Any number of clients, CDN nodes, and streaming media centers are possible depending on implementation needs.

When the user watches the live streaming video, jitter may occur, i.e., changes occur in a delay time of live streaming data. The live streaming jitter may appear as frame freezing or mosaics in live streaming pictures. Due to a strong real-time performance of the live streaming video, viewing experience of the user may be affected by the live streaming jitter. Therefore, there is a need to accurately detect the live streaming jitter in the CDN.

At present, the live streaming jitter may be detected by detecting data (e.g., video encoding and decoding data) of a client log; however, the method cannot be used when the client log cannot be obtained; or the live streaming jitter may be detected by a third-party by detecting a communication link delay; however, the method cannot accurately detect a live streaming delay due to a difference between the communication link delay and a live streaming data delay.

To solve the problem described above, an example embodiment of the present disclosure provides a method for detecting live streaming jitter, the method including: calculating, for a live stream transmitted by an edge content delivery network (CDN) node in a CDN, quality information of the live stream based on a transmission frame rate and a viewer count of the live stream; calculating quality information of the edge CDN node based on the quality information of the live stream; and determining, based on the quality information of the edge CDN node, whether jitter occurs at the edge CDN node.

Figure 3:
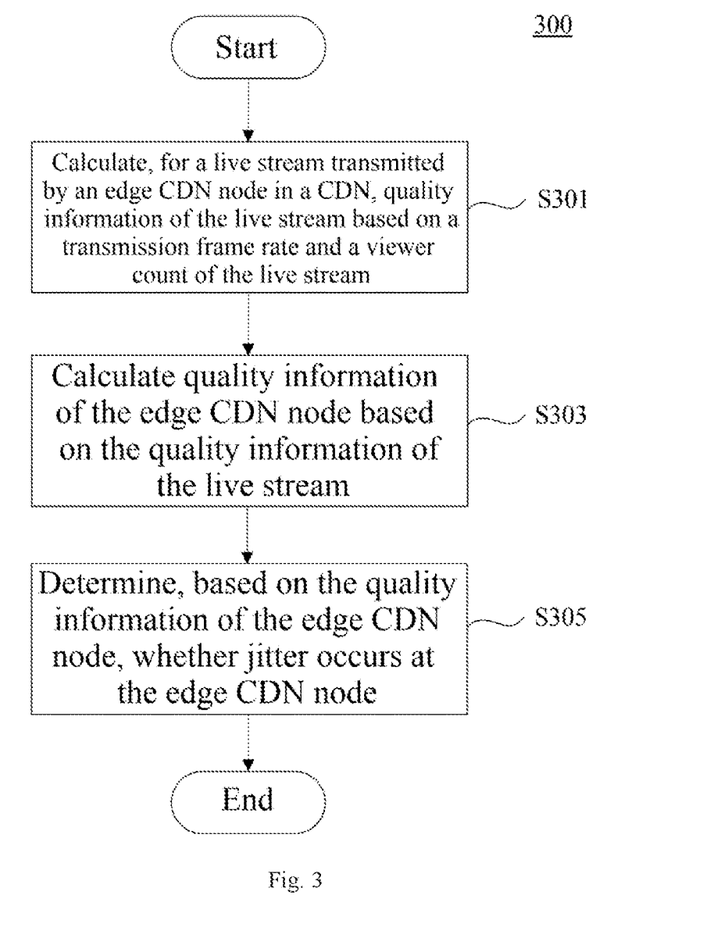
FIG. 3 is a flowchart of a method for detecting live streaming jitter according to an embodiment of the present disclosure.

FIG. 3 is a flowchart of a method 300 for detecting live streaming jitter according to an embodiment of the present disclosure. As shown in FIG. 3, the method includes: step S301: calculating, for a live stream transmitted by an edge content delivery network (CDN) node in a CDN, quality information of the live stream based on a transmission frame rate and a viewer count of the live stream; step S303: calculating quality information of the edge CDN node based on the quality information of the live stream; and step S305: determining, based on the quality information of the edge CDN node, whether jitter occurs at the edge CDN node.

In the method for detecting live streaming jitter described in this embodiment of the present disclosure, live streaming jitter at the edge CDN node may be detected accurately and conveniently, because a quality score of the live stream is calculated based on the transmission frame rate and the viewer count of the live stream at the edge CDN node, and a quality score of the edge CDN node is further calculated based on the quality score of the live stream. Particularly, the live streaming jitter at the edge CDN will be evaluated more accurately, because the viewer count of the live stream is considered in calculating the quality score of the live stream, for example, the jitter of the live stream with less viewer count will be given less consideration, while the jitter of the live stream with greater viewer count will be given greater consideration.

At step S301, for each live stream in at least one live stream transmitted by the edge CDN node in the CDN, quality information of the live stream is calculated based on a transmission frame rate and a viewer count of the live stream.

According to some embodiments, the live stream is all the live streams transmitted by the edge CDN node, or part of the live streams transmitted by the edge CDN node. According to some embodiments, based on factors such as the viewer count, some of the live streams can be selected from all the live streams transmitted by the edge CDN node (for example, live streams with large viewer counts are selected), and quality information of these live streams is calculated.

According to some embodiments, the quality information of the live stream may be a score, or may be another type of information that reflects quality of the live stream, for example, information representing whether the quality of the live stream is good or poor.

According to some embodiments, the transmission frame rate of the live stream is the number of frames of the live stream received by the edge CDN node from its upper-level node per second. It may be understood that when the transmission frame rate of the live stream changes, a delay of data of the live stream received by the edge CDN node also changes.

In an embodiment of the present disclosure, the viewer count of the live stream is the number of clients that request the data of the live stream form the edge CDN node, for example, for the edge CDN node 202a in FIG. 2, if the client 201a and the client 201b request data of a same live stream A, the viewer count of the live stream A at the edge CDN node is 2.

At step S303, the quality information of the edge CDN node is calculated based on the quality information of the live stream.

According to some embodiments, a plurality of live streams are transmitted by the edge CDN node, where calculating quality information of the live stream includes: calculating, for each live stream transmitted by the edge content delivery network (CDN) node in the CDN, quality information of the live stream based on the transmission frame rate and the viewer count of the live stream, wherein calculating quality information of the edge CDN node based on the quality information of the live stream includes: calculating an average number of the quality information of the plurality of live streams, and taking the average number as the quality information of the edge CDN node.

According to some embodiments, the quality information of the edge CDN node may be a score, or may be another type of information that reflects live streaming quality of the edge CDN node, for example, information representing whether the live streaming quality of the edge CDN node is good or poor.

At step S305, whether jitter occurs at the edge CDN node is determined based on the quality information of the edge CDN node.

According to some embodiments, the quality information of the edge CDN node may be compared with a quality information threshold to determine whether jitter occurs at the edge CDN node, wherein the quality information threshold may be calculated based on historical values of the quality information of the edge CDN node.

According to some embodiments, whether jitter occurs at the edge CDN node at this moment may be determined based on a moving average value of the quality information of the edge CDN node.

According to some embodiments, calculating quality information of the live stream based on a transmission frame rate and a viewer count of the live stream includes: calculating, for the live stream, transmission frame rates at a plurality of first moments within first duration; calculating a stability score of the live stream based on the transmission frame rates at the plurality of first moments; obtaining the viewer count of the live stream; and calculating the quality information of the live stream based on the stability score and the viewer count of the live stream.

Figure 4:
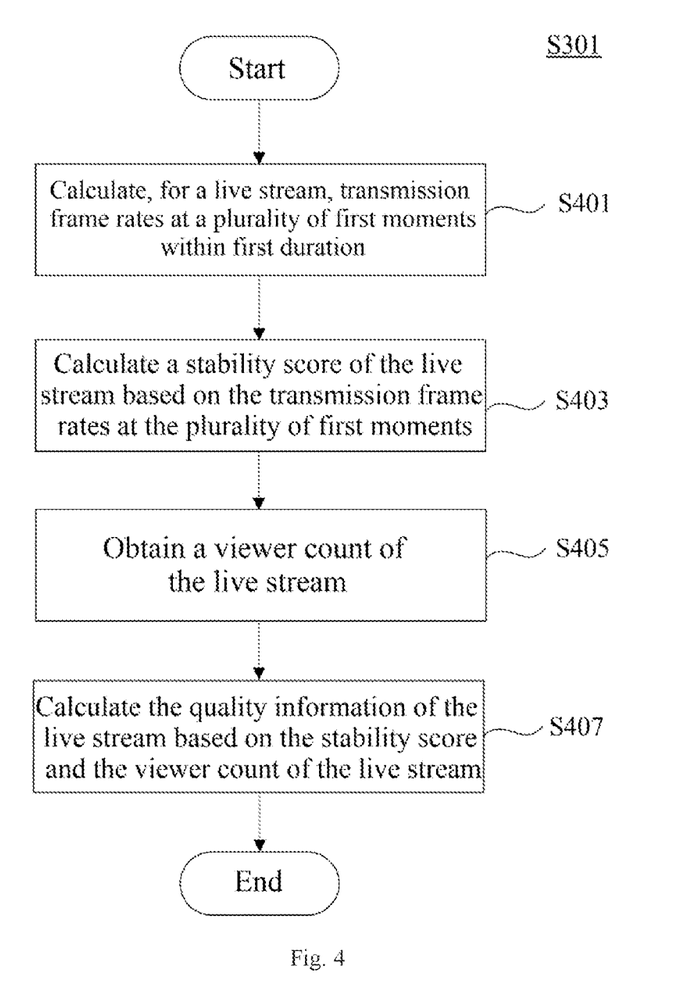
FIG. 4 is a flowchart of an example process of calculating quality information of a live stream based on a transmission frame rate and a viewer count of the live stream in the method of FIG. 3 according to an embodiment of the present disclosure.

FIG. 4 is a flowchart of an example process of calculating quality information of a live stream based on a transmission frame rate and a viewer count of the live stream (step S301) in the method of FIG. 3 according to an embodiment of the present disclosure.

At step S401, for the live stream, transmission frame rates at a plurality of first moments within first duration are calculated.

According to some embodiments, the transmission frame rate of the live stream is calculated every predetermined calculation period within the first duration, for example, the transmission frame rate of the live streaming rate is calculated every second when the first duration is 10 s.

At step S403, a stability score of the live stream is calculated based on the transmission frame rates at the plurality of first moments.

According to some embodiments, calculating a stability score of the live stream based on the transmission frame rates at the plurality of first moments includes: calculating a variance of the transmission frame rates at the plurality of first moments, and taking the variance as the stability score of the live stream.

At step S405, the viewer count of the live stream is obtained.

According to an embodiment of the present disclosure, as described above, the viewer count of the live stream is the number of clients that request data of the live stream from the edge CDN node.

At step S407, the quality information of the live stream is calculated based on the stability score and the viewer count of the live stream.

According to some embodiments, calculating the quality information of the live stream based on the stability score and the viewer count of the live stream includes: calculating a product of the stability score and the viewer count of the live stream, and taking the product as the quality information of the live stream.

Figure 5:
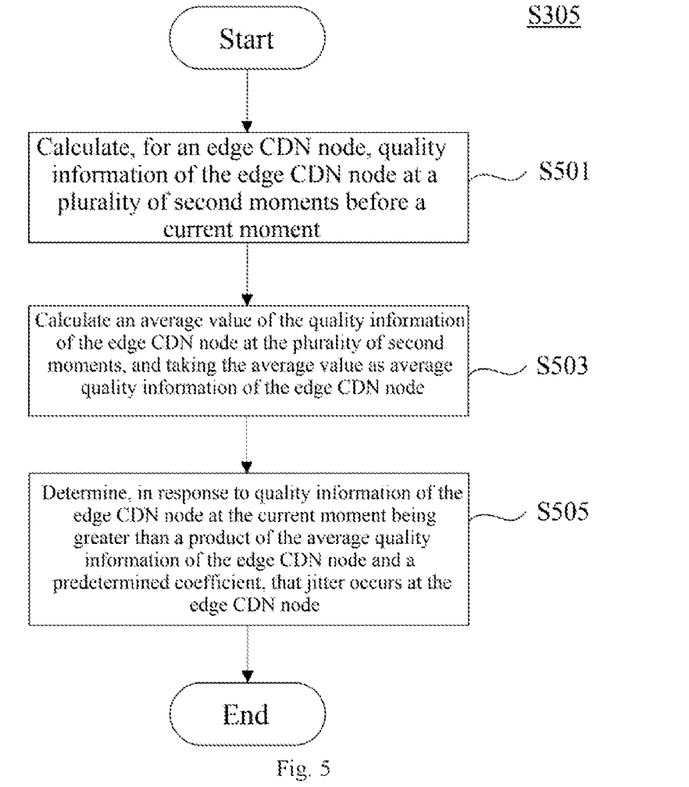
FIG. 5 is a flowchart of an example process of determining, based on quality information of an edge CDN node, whether jitter occurs at the edge CDN node in the method of FIG. 3 according to an embodiment of the present disclosure.

According to some embodiments, the determining, based on the quality information of the edge CDN node, whether jitter occurs at the edge CDN node includes: calculating, for the edge CDN node, the quality information of the edge CDN node at a plurality of second moments before a current moment; calculating an average value of the quality information of the edge CDN node at the plurality of second moments, and taking the average value as average quality information of the edge CDN node; and determining, in response to quality information of the edge CDN node at the current moment being greater than a product of the average quality information of the edge CDN node and a predetermined coefficient, that jitter occurs at the edge CDN node.

FIG. 5 is a flowchart of an example process of determining, based on quality information of an edge CDN node, whether jitter occurs at the edge CDN node (step S305) in the method of FIG. 3 according to an embodiment of the present disclosure.

At step S501, for the edge CDN node, the quality information of the edge CDN node is calculated at a plurality of second moments before a current moment.

According to some embodiments, the quality information of the edge CDN node is calculated every predetermined detection period (e.g., 10 s), and the quality information at the plurality of second moments is quality information calculated in a plurality of periods before a current period, for example, the quality information respectively calculated in five periods before the current period.

At step S503, an average value of the quality information of the edge CDN node at the plurality of second moments is calculated, and the average value is taken as average quality information of the edge CDN node.

At step S505, that jitter occurs at the edge CDN node is determined in response to quality information of the edge CDN node at the current moment being greater than a product of the average quality information of the edge CDN node and a predetermined coefficient.

According to some embodiments, the plurality of second moments before the current moment do not include a moment when corresponding quality information thereof indicates that jitter occurs at the edge CDN node. That is, if it is detected that jitter occurs at the edge CDN at a certain moment, quality information of the edge CDN node at that moment will not be used to evaluate a jitter status at a subsequent moment.

According to some embodiments, the method for detecting live streaming jitter further includes: calculating, for a non-edge CDN node in the CDN, quality information of the non-edge CDN node based on quality information of an edge CDN node corresponding to the non-edge CDN node; and determining, based on the quality information of the non-edge CDN node, whether jitter occurs at the non-edge CDN node.

According to some embodiments, the quality information of the non-edge CDN node may be a score, or may be another type of information that reflects live streaming quality of the non-edge CDN node, for example, information representing whether the live streaming quality of the non-edge CDN node is good or poor.

In an embodiment of the present disclosure, the non-edge CDN node is a CDN node in the CDN that is not an edge CDN node, for example, the second-level CDN nodes 203*a* and 203*b*, and the n-level CDN node 204 in FIG. 2.

According to some embodiments, the edge CDN node corresponding to the non-edge CDN node includes: an edge CDN node directly connected to the non-edge CDN node, or an edge CDN node connected to the non-edge CDN node through a lower-level non-edge CDN node of the non-edge CDN node. For example, in FIG. 2, the edge CDN node corresponding to the second-level CDN node 203*a* includes its lower-level edge CDN nodes 202*a* to 202*b*, and the edge CDN node corresponding to the n-level node 204 includes the edge CDN nodes 202*a* to 202*c* that are connected to the n-level node 204 through its lower-level CDN node.

According to some embodiments, calculating quality information of the non-edge CDN node based on quality information of an edge CDN node corresponding to the non-edge CDN node includes: calculating an average value of the quality information of the edge CDN node corresponding to the non-edge CDN node as the quality information of the non-edge CDN node.

In an embodiment of the present disclosure, determining whether jitter occurs at each CDN node may determine the range over which jitter occurs, thereby determining the cause of the jitter.

Figure 6:
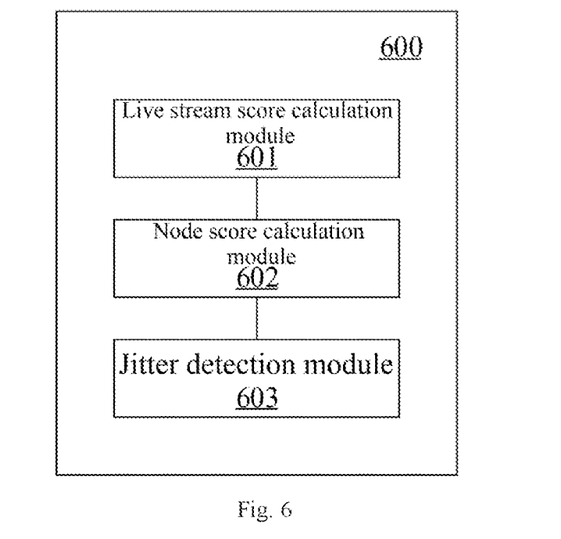
FIG. 6 is a structural block diagram of an apparatus for detecting live streaming jitter according to an embodiment of the present disclosure.

FIG. 6 is a structural block diagram of an apparatus 600 for detecting live streaming jitter according to an embodiment of the present disclosure.

As shown in FIG. 6, the apparatus 600 for detecting live streaming jitter includes: a live stream score calculation module 601 configured to: calculate, for a live stream transmitted by an edge content delivery network (CDN) node in a CDN, quality information of the live stream based on a transmission frame rate and a viewer count of the live stream; a node score calculation module 602 configured to: calculate quality information of the edge CDN node based on the quality information of the live stream; and a jitter detection module 603 configured to: determine, based on the quality information of the edge CDN node, whether jitter occurs at the edge CDN node.

According to an embodiment of the present disclosure, there is further provided an electronic device, including: at least one processor; and a memory communicatively connected to the at least one processor, wherein the memory stores instructions executable by the at least one processor, and when executed by the at least one processor, the instructions cause the at least one processor to perform the method described in the present disclosure.

According to an embodiment of the present disclosure, there is further provided a non-transitory computer-readable storage medium storing computer instructions, wherein the computer instructions are used to cause a computer to perform the method described in the present disclosure.

According to an embodiment of the present disclosure, there is further provided a computer program product, including a computer program, wherein when the computer program is executed by a processor, the method described in the present disclosure is implemented.

In the technical solutions of the present disclosure, obtaining, storage, application, etc. of personal information of a user all comply with related laws and regulations and are not against the public order and good morals.

According to the embodiments of the present disclosure, there are further provided an electronic device, a readable storage medium, and a computer program product.

Figure 7:
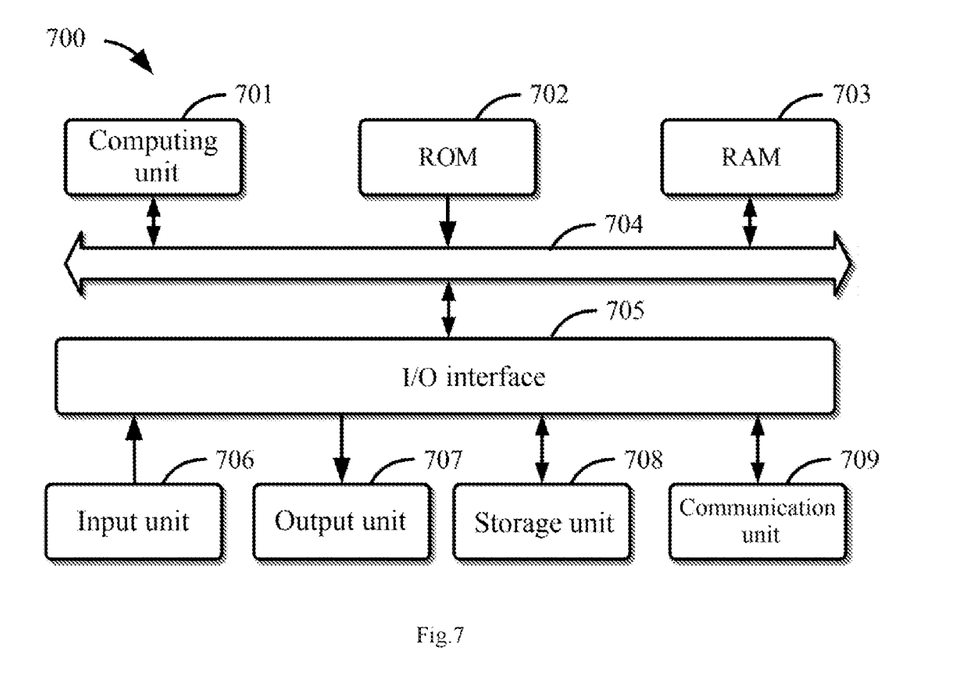
FIG. 7 is a structural block diagram of an example electronic device that can be used to implement an embodiment of the present disclosure.

Referring to FIG. 7, a structural block diagram of an electronic device 700 that can serve as a server or a client of the present disclosure is now described, which is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the device 700 includes a computing unit 701, which may perform various appropriate actions and processing according to a computer program stored in a read-only memory (ROM) 702 or a computer program loaded from a storage unit 708 to a random access memory (RAM) 703. The RAM 703 may further store various programs and data required for the operation of the device 700. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, an output unit 707, the storage unit 708, and a communication unit 709. The input unit 706 may be any type of device capable of entering information to the device 700. The input unit 706 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 707 may be any type of device capable of presenting information, and may include, but is not limited to, a display, a speaker, a video/audio output terminal, a vibrator, and/or a printer. The storage unit 708 may include, but is not limited to, a magnetic disk and an optical disc. The communication unit 709 allows the device 700 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMAX device, a cellular communication device and/or the like.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the method 300. For example, in some embodiments, the method 300 may be implemented as a computer software program, which is tangibly contained in a machine-readable medium, such as the storage unit 708. In some embodiments, a part or all of the computer program may be loaded and/or installed onto the device 700 via the ROM 702 and/or the communication unit 709. When the computer program is loaded onto the RAM 803 and executed by the computing unit 701, one or more steps of the method 300 described above can be performed. Alternatively, in other embodiments, the computing unit 701 may be configured, by any other suitable means (for example, by means of firmware), to perform the method 300.

Various implementations of the systems and technologies described herein above may be implemented in a digital electronic circuit system, an integrated circuit system, a field programmable gate array (FPGA), an application-specific integrated circuit. (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure may be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein may be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user may provide an input to the computer. Other types of apparatuses can also be used to provide interaction with the user; for example, a feedback provided to the user may be any form of sensory feedback (for example, a visual feedback, an auditory feedback, or a tactile feedback), and an input from the user may be received in any form (including an acoustic input, a voice input, or a tactile input).

The systems and technologies described herein may be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps described in the present disclosure may be performed in parallel, sequentially, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems, and devices described above are merely example embodiments or examples, and the scope of the present invention is not limited by the embodiments or examples, but only defined by the appended claims when allowed and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A computer-implemented method for detecting live streaming jitter, the method comprising:
    calculating, for a live stream transmitted by an edge content delivery network (CDN) node in a CDN, quality information of the live stream based on a transmission frame rate and a viewer count of the live stream;
    calculating quality information of the edge CDN node based on the quality information of the live stream; and
    determining, based on the quality information of the edge CDN node, whether jitter occurs at the edge CDN node;
    wherein the determining, based on the quality information of the edge CDN node, whether jitter occurs at the edge CDN node comprises:
    calculating, for the edge CDN node, the quality information of the edge CDN node at a plurality of second moments before a current moment;
    calculating an average value of the quality information of the edge CDN node at the plurality of second moments, and taking the average value as average quality information of the edge CDN node; and
    determining, in response to quality information of the edge CDN node at the current moment being greater than a product of the average quality information of the edge CDN node and a predetermined coefficient, that jitter occurs at the edge CDN node.

2. The method of claim 1, wherein calculating quality information of the live stream based on the transmission frame rate and the viewer count of the live stream comprises:
    calculating, for the live stream, transmission frame rates at a plurality of first moments within first duration;
    calculating a stability score of the live stream based on the transmission frame rates at the plurality of first moments;
    obtaining the viewer count of the live stream; and
    calculating the quality information of the live stream based on the stability score and the viewer count of the live stream.

3. The method of claim 2, wherein the calculating a stability score of the live stream based on the transmission frame rates at the plurality of first moments comprises:
    calculating a variance of the transmission frame rates at the plurality of first moments, and taking the variance as the stability score of the live stream.

4. The method of claim 2, wherein the calculating the quality information of the live stream based on the stability score and the viewer count of the live stream comprises:
    calculating a product of the stability score and the viewer count of the live stream, and taking the product as the quality information of the live stream.

5. The method of claim 1, wherein the plurality of second moments before the current moment do not comprise a moment when corresponding quality information thereof indicates that jitter occurs at the edge CDN node.

6. The method of claim 1, wherein a plurality of live streams are transmitted by the edge CDN node,
    wherein calculating quality information of the live stream comprises:
    calculating, for each live stream transmitted by the edge content delivery network (CDN) node in the CDN, the quality information of the live stream based on the transmission frame rate and the viewer count of the live stream,
    wherein calculating quality information of the edge CDN node based on the quality information of the live stream comprises:
    calculating an average number of the quality information of the plurality of live streams, and taking the average number as the quality information of the edge CDN node.

7. The method of claim 1, further comprising:
    calculating, for a non-edge CDN node in the CDN, quality information of the non-edge CDN node based on quality information of an edge CDN node corresponding to the non-edge CDN node; and
    determining, based on the quality information of the non-edge CDN node, whether jitter occurs at the non-edge CDN node.

8. The method of claim 7, wherein the edge CDN node corresponding to the non-edge CDN node comprises: an edge CDN node directly connected to the non-edge CDN node, or an edge CDN node connected to the non-edge CDN node through a lower-level non-edge CDN node of the non-edge CDN node.

9. The method of claim 7, wherein the calculating quality information of the non-edge CDN node based on quality information of an edge CDN node corresponding to the non-edge CDN node comprises:
    calculating an average value of the quality information of the edge CDN node corresponding to the non-edge CDN node as the quality information of the non-edge CDN node.

10. The method of claim 1, wherein the live stream is all the live streams transmitted by the edge CDN node, or part of the live streams transmitted by the edge CDN node.

11. An electronic device, comprising:
    at least one processor; and
    a non-transitory memory communicatively connected to the at least one processor, wherein
    the memory stores instructions executable by the at least one processor, and when executed by the at least one processor, the instructions cause the at least one processor to perform processing comprising:

calculating, for a live stream transmitted by an edge content delivery network (CDN) node in a CDN, quality information of the live stream based on a transmission frame rate and a viewer count of the live stream;

calculating quality information of the edge CDN node based on the quality information of the live stream; and determining, based on the quality information of the edge CDN node, whether jitter occurs at the edge CDN node;

wherein the determining, based on the quality information of the edge CDN node, whether jitter occurs at the edge CDN node comprises:

calculating, for the edge CDN node, the quality information of the edge CDN node at a plurality of second moments before a current moment;

calculating an average value of the quality information of the edge CDN node at the plurality of second moments, and taking the average value as average quality information of the edge CDN node; and determining, in response to quality information of the edge CDN node at the current moment being greater than a product of the average quality information of the edge CDN node and a predetermined coefficient, that jitter occurs at the edge CDN node.

12. The electronic device of claim 11, wherein calculating quality information of the live stream based on the transmission frame rate and the viewer count of the live stream comprises:

calculating, for the live stream, transmission frame rates at a plurality of first moments within first duration;

calculating a stability score of the live stream based on the transmission frame rates at the plurality of first moments;

obtaining the viewer count of the live stream; and calculating the quality information of the live stream based on the stability score and the viewer count of the live stream.

13. The electronic device of claim 12, wherein the calculating a stability score of the live stream based on the transmission frame rates at the plurality of first moments comprises:

calculating a variance of the transmission frame rates at the plurality of first moments, and taking the variance as the stability score of the live stream.

14. The electronic device of claim 12, wherein the calculating the quality information of the live stream based on the stability score and the viewer count of the live stream comprises:

calculating a product of the stability score and the viewer count of the live stream, and taking the product as the quality information of the live stream.

15. The electronic device of claim 12, wherein the plurality of second moments before the current moment do not comprise a moment when corresponding quality information thereof indicates that jitter occurs at the edge CDN node.

16. The electronic device of claim 11, wherein a plurality of live streams are transmitted by the edge CDN node, wherein calculating quality information of the live stream comprises:

calculating, for each live stream transmitted by the edge content delivery network (CDN) node in the CDN, the quality information of the live stream based on the transmission frame rate and the viewer count of the live stream, wherein calculating quality information of the edge CDN node based on the quality information of the live stream comprises:

calculating an average number of the quality information of the plurality of live streams, and taking the average number as the quality information of the edge CDN node.

17. The electronic device of claim 11, wherein the instructions cause the at least one processor to execute processing further comprising:

calculating, for a non-edge CDN node in the CDN, quality information of the non-edge CDN node based on quality information of an edge CDN node corresponding to the non-edge CDN node; and determining, based on the quality information of the non-edge CDN node, whether jitter occurs at the non-edge CDN node.

18. A non-transitory computer-readable storage medium storing computer instructions, wherein the computer instructions are used to cause the computer to perform processing comprising:

calculating, for a live stream transmitted by an edge content delivery network (CDN) node in a CDN, quality information of the live stream based on a transmission frame rate and a viewer count of the live stream;

calculating quality information of the edge CDN node based on the quality information of the live stream; and determining, based on the quality information of the edge CDN node, whether jitter occurs at the edge CDN node.

* * * * *